United States Patent
Tsutsumi

(10) Patent No.: US 10,642,033 B2
(45) Date of Patent: May 5, 2020

(54) IMAGE DISPLAY DEVICE AND IMAGE DISPLAY METHOD

(71) Applicant: HONDA MOTOR CO., LTD., Minato-ku, Tokyo (JP)

(72) Inventor: Yojiro Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/066,683

(22) PCT Filed: Jan. 6, 2017

(86) PCT No.: PCT/JP2017/000242
§ 371 (c)(1),
(2) Date: Jun. 28, 2018

(87) PCT Pub. No.: WO2017/138278
PCT Pub. Date: Aug. 17, 2017

(65) Prior Publication Data
US 2019/0155024 A1  May 23, 2019

(30) Foreign Application Priority Data
Feb. 12, 2016 (JP) ................ 2016-025244

(51) Int. Cl.
*B60K 35/00* (2006.01)
*G02B 27/01* (2006.01)
(Continued)

(52) U.S. Cl.
CPC .......... *G02B 27/0101* (2013.01); *B60K 35/00* (2013.01); *B60K 37/06* (2013.01);
(Continued)

(58) Field of Classification Search
CPC .... B60K 2370/1464; B60K 2370/1529; B60K 2370/166; B60K 2370/167; B60K 2370/169; B60K 2370/177; B60K 2370/52; B60K 35/00; B60K 37/06; G02B 2027/0141; G02B 2027/0178; G02B 2027/0181; G02B 27/0101; G02B 27/017; G02B 27/0172; G06F 3/0346; G06F 3/0481; G06F 3/01; G09G 5/00; H04N 5/64
See application file for complete search history.

(56) References Cited

U.S. PATENT DOCUMENTS

2005/0258229 A1   11/2005  Minemura
2012/0095643 A1*   4/2012  Bose ............... B60K 37/00
                                                701/32.8
(Continued)

FOREIGN PATENT DOCUMENTS

DE  102014004178   9/2015
JP  09-309372      12/1997
(Continued)

OTHER PUBLICATIONS

Extended European Search Report for European Patent Application No. 17750003.0 dated Jun. 21, 2019.
(Continued)

*Primary Examiner* — Hong Zhou
(74) *Attorney, Agent, or Firm* — Amin, Turocy & Watson, LLP

(57) ABSTRACT

An image display device includes an acquisition unit that acquires two or more types of information, a detection unit that detects at least one of an acceleration, an orientation, and an angular velocity of the image display device, an image change section that determines a state of the image display device on the basis of a detection result of the detection unit, switches information, which is to be selected from the two or more types of information acquired by the acquisition unit, in accordance with the determined state of the image display device, and generates display data based on the switched information, and a display unit that displays the display data.

6 Claims, 6 Drawing Sheets

(51) Int. Cl.
*G06F 3/0346* (2013.01)
*G06F 3/0481* (2013.01)
*H04N 5/64* (2006.01)
*G09G 5/00* (2006.01)
*B60K 37/06* (2006.01)

(52) U.S. Cl.
CPC ....... *G02B 27/017* (2013.01); *G02B 27/0172* (2013.01); *G06F 3/0346* (2013.01); *G06F 3/0481* (2013.01); *G09G 5/00* (2013.01); *H04N 5/64* (2013.01); *B60K 2370/1464* (2019.05); *B60K 2370/1529* (2019.05); *B60K 2370/166* (2019.05); *B60K 2370/167* (2019.05); *B60K 2370/169* (2019.05); *B60K 2370/177* (2019.05); *B60K 2370/52* (2019.05); *G02B 2027/0141* (2013.01); *G02B 2027/0178* (2013.01); *G02B 2027/0181* (2013.01)

(56) References Cited

U.S. PATENT DOCUMENTS

| | | | |
|---|---|---|---|
| 2013/0127608 | A1 | 5/2013 | Ishikawa et al. |
| 2014/0098008 | A1* | 4/2014 | Hatton .................... G06T 11/00 345/8 |
| 2015/0087275 | A1 | 3/2015 | Brisebois |
| 2016/0070966 | A1* | 3/2016 | Yang .................. G06K 9/00335 345/8 |
| 2016/0378182 | A1* | 12/2016 | Nguyen .................. G06F 3/012 345/156 |
| 2017/0003750 | A1* | 1/2017 | Li ............................ G06F 3/017 |

FOREIGN PATENT DOCUMENTS

| | | |
|---|---|---|
| JP | 2003-345492 | 12/2003 |
| JP | 2005-099908 | 4/2005 |
| JP | 2007-134785 | 5/2007 |
| JP | 2010-097393 | 4/2010 |
| JP | 2013-083731 | 5/2013 |
| JP | 2013-108841 | 6/2013 |
| WO | 2012/040386 | 3/2012 |

OTHER PUBLICATIONS

International Search Report and Written Opinion for International Patent Application No. PCT/JP2017/000242 dated Apr. 11, 2017, 12 pages.

Japanese Notice of Allowance for Japanese Patent Application No. 2017-566547 dated Sep. 3, 2019.

* cited by examiner

FIG. 3

| STATE | THRESHOLD VALUE OF ORIENTATION | PREDETERMINED TIME |
|---|---|---|
| UPWARD STATE | $\theta_{12}, \phi_{12}$ | $t_{11}$ |
| FRONTWARD STATE | $\theta_{22}, \phi_{22}$ | $t_{21}$ |
| DOWNWARD STATE | $\theta_{32}, \phi_{32}$ | $t_{31}$ |
| LEFTWARD STATE | $\theta_{42}, \phi_{42}$ | $t_{41}$ |
| RIGHTWARD STATE | $\theta_{52}, \phi_{52}$ | $t_{51}$ |
| UPWARD LEFT STATE | $\theta_{62}, \phi_{62}$ | $t_{61}$ |
| UPWARD RIGHT STATE | $\theta_{72}, \phi_{72}$ | $t_{71}$ |
| DOWNWARD LEFT STATE | $\theta_{82}, \phi_{82}$ | $t_{81}$ |
| DOWNWARD RIGHT STATE | $\theta_{92}, \phi_{92}$ | $t_{91}$ |

FIG. 4

| OPERATION | CHANGE AMOUNT OF ORIENTATION | PREDETERMINED TIME |
|---|---|---|
| DOWNWARD FROM FRONTWARD | $\Delta\theta_{201}, \Delta\phi_{101}$ | $t_{101}$ |
| FRONTWARD FROM UPWARD | $\Delta\theta_{201}, \Delta\phi_{201}$ | $t_{201}$ |
| DOWNWARD FROM UPWARD | $\Delta\theta_{301}, \Delta\phi_{301}$ | $t_{301}$ |
| RIGHTWARD FROM FRONTWARD | $\Delta\theta_{401}, \Delta\phi_{401}$ | $t_{401}$ |
| LEFTWARD FROM FRONTWARD | $\Delta\theta_{501}, \Delta\phi_{501}$ | $t_{501}$ |

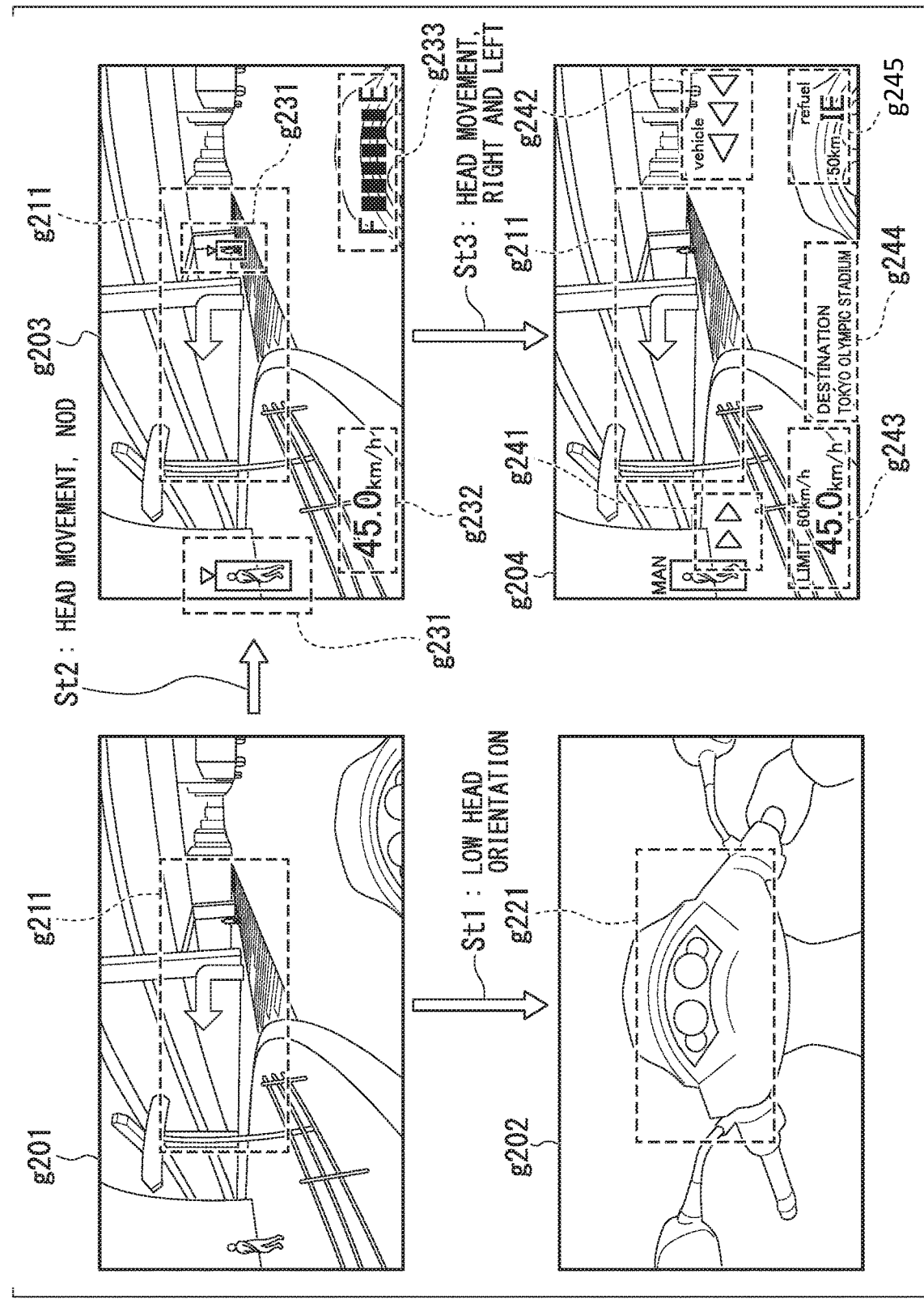

IMAGE DISPLAY DEVICE AND IMAGE DISPLAY METHOD

TECHNICAL FIELD

The present invention relates to an image display device and an image display method.

Priority is claimed on Japanese Patent Application No. 2016-025244, filed Feb. 12, 2016, the content of which is incorporated herein by reference.

BACKGROUND ART

In recent years, an image display device used by being mounted on a person's head has been developed. As such an image display device, there is a non-transmission type which covers the eyes and a transmission type which does not cover the eyes. In the non-transmission type, only an image is displayed on a display unit. Therefore, a user can view only the image. In the transmission type, a display unit, for example, is a half mirror. Therefore, a user can view both the outside environment and the image.

Since such an image display device is mounted on the head of a user, when the user moves his/her head, there may be cases where the outside or the image is hard to see. In contrast, an image display device capable of reliably transmitting character information serving as an image even when a user moves his/her head has been proposed (for example, see Patent Literature 1).

CITATION LIST

Patent Literature

[Patent Literature 1]
Japanese Unexamined Patent Application, First Publication No. 2007-134785

SUMMARY OF INVENTION

Technical Problem

However, in the technology disclosed in Patent Literature 1, since image data is changed and displayed in accordance with the movement of the head, even though it is possible to transmit the character information serving as an image even when the user moves his/her head, it is not possible to change information to be displayed on the basis of the user's will.

An object of the present invention is to provide an image display device and an image display method, by which it is possible to change information to be displayed in accordance with the movement of the image display device.

Solution to Problem

In order to achieve the aforementioned objects, the present invention employs the following modes.

(1) An image display device of an aspect according to the present invention includes an acquisition unit that acquires two or more types of information, a detection unit that detects at least one of an acceleration, an orientation, and an angular velocity of the image display device, an image change section that determines a state of the image display device on the basis of a detection result of the detection unit, switches information, which is to be selected from the two or more types of information acquired by the acquisition unit, in accordance with the determined state of the image display device, and generates display data based on the switched information, and a display unit that displays the display data.

(2) In the aspect of the aforementioned (1), on the basis of the detection result of the detection unit, the image change section may determine the state of the image display device regarding at least one of up and down, right and left, and oblique directions with respect to a reference state of the image display device.

(3) In the aspect of the aforementioned (1) or (2), the image change section may generate additional information when the image display device performs a reciprocal operation between a reference posture and an out-of-reference posture, in a predetermined time.

(4) In the aspect of the aforementioned (3), the additional information may be information corresponding to a use situation of the image display device.

(5) In the aspect of the aforementioned (3) or (4), when a user of the image display device is boarding a vehicle, the acquisition unit may acquire information on the vehicle from the vehicle, and the additional information may be the information on the vehicle.

(6) An image display method of an aspect according to the present invention is an image display method of an image display device, and the image display method includes an acquisition step of acquiring two or more types of information, a detection step of detecting at least one of an acceleration, an orientation, and an angular velocity of the image display device, an image change step of determining a state of the image display device on the basis of a detection result in the detection step, switching information, which is to be selected from the two or more types of information acquired in the acquisition step, in accordance with the determined state of the image display device, and generating display data based on the switched information, and a display step of displaying the display data.

Advantageous Effects of Invention

According to the mode of the aforementioned (1) or (6), it is possible to change a plurality of pieces of display data by a simple operation of the image display device.

In the case of the aforementioned (2), it is possible to selectively display a large number of pieces of display data by a simple operation of the image display device.

In the case of the aforementioned (3), it is possible to display different types of information in accordance with operation patterns.

In the case of the aforementioned (4), display of the additional information corresponding to use situations of the image display device can be switched in accordance with the operations of the image display device.

In the case of the aforementioned (5), information on the vehicle can be displayed on the image display device and the displayed information can be switched in accordance with the operations of the image display device.

BRIEF DESCRIPTION OF DRAWINGS

FIG. 3 is a diagram representing an example of detection values regarding states stored in a storage section according to the first embodiment.

FIG. 4 is a diagram representing an example of detection values regarding operations stored in the storage section according to the first embodiment.

FIG. 8 is a diagram representing an example of information displayed on a display unit according to the second embodiment.

DESCRIPTION OF EMBODIMENTS

Hereinafter, embodiments of the present invention will be described with reference to the drawings. In the following description, a spectacles-type head mounted display (hereinafter, referred to as an HMD) will be described as an example of an image display device.

First Embodiment

Figure 1:
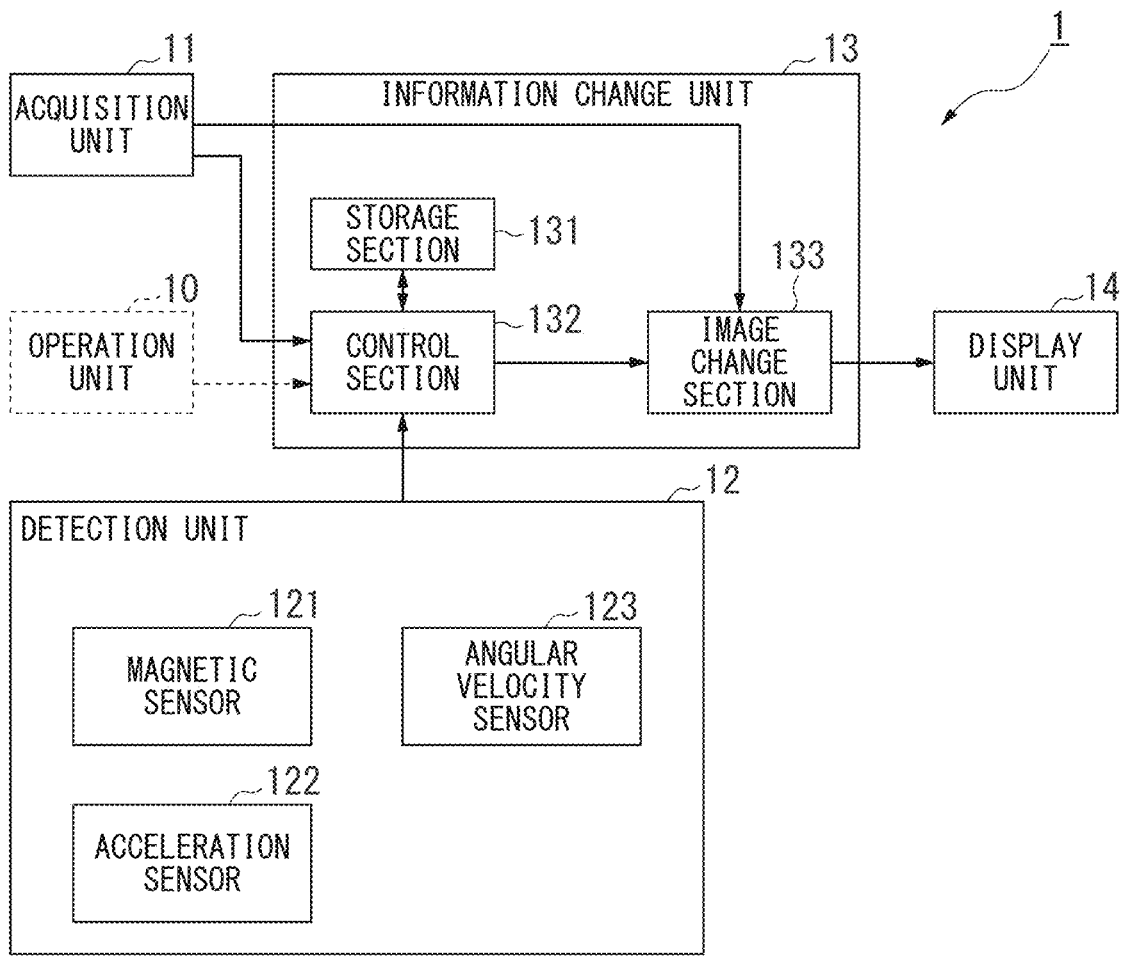
FIG. 1 is a block diagram representing a schematic configuration of an HMD according to a first embodiment.

FIG. 1 is a block diagram representing a schematic configuration of an HMD 1 according to the present embodiment.

As illustrated in FIG. 1, the HMD 1 includes an operation unit 10, an acquisition unit 11, a detection unit 12, an information change unit 13, and a display unit 14. The detection unit 12 includes a magnetic sensor 121 (a detection unit), an acceleration sensor 122 (a detection unit), and an angular velocity sensor 123 (a detection unit)

The information change unit 13 includes a storage section 131, a control section 132, and an image change section 133.

The operation unit 10, for example, includes a mechanical switch, a touch panel switch and the like. The operation unit 10 detects operation results of a user and outputs detected operation instructions to the control section 132. The HMD 1 may not include the operation unit 10. In this case, in the HMD 1, the acquisition unit 11 may acquire operation instructions from an external device (not illustrated) and output the acquired operation instructions to the control section 132. The external device, for example, is a portable terminal such as a smart phone, a remote controller and the like. The operation instructions, for example, are an instruction for allowing the power supply of the HMD 1 to be in an ON state or an OFF state, an instruction for performing a learning mode, an instruction regarding whether to display information on the display unit 14, an instruction for allowing the HMD 1 to display what information in what state, and the like. The learning mode is a mode for learning a threshold value and a predetermined time for determining a downward state, a longitudinal swing operation, and a lateral swing operation. The downward state indicates a state in which a user lowers his/her head. The longitudinal swing operation indicates a state in which a user shakes his/her head in a longitudinal direction several times to give a nod. The lateral swing operation indicates a state in which a user shakes his/her head in a lateral direction several times.

The acquisition unit 11 includes at least one of a wired communication system and a wireless communication system. The acquisition unit 11 acquires information from the external device and outputs the acquired information to the image change section 133. The information acquired from the external device, for example, is navigation information to a destination, information on a weather forecast of a current place or a destination, information on today's schedule, and the like. When the operation instruction is acquired from the external device, the acquisition unit 11 outputs the acquired operation instruction to the control section 132.

The detection unit 12 detects the states of the HMD 1 and outputs the detected state information to the control section 132. The states of the HMD 1 are an inclination of the HMD 1, a movement of the HMD 1, an orientation of the HMD 1, and the like. The state information includes at least one of information indicating an orientation, information indicating an acceleration direction, and information indicating an angular velocity.

The magnetic sensor 121, for example, is a geomagnetic sensor, and detects the orientation of the HMD 1. The magnetic sensor 121 outputs the detected value to the control section 132.

The acceleration sensor 122, for example, is a triaxial sensor, and detects the inclination of the HMD 1. The acceleration sensor 122 detects the acceleration direction on the basis of a gravitational acceleration, and outputs the detected value to the control section 132.

The angular velocity sensor 123, for example, is a gyro sensor, and detects the rotation of the HMD 1. The angular velocity sensor 123 outputs the detected value to the control section 132.

The information change unit 13 determines the states of the HMD 1 (for example, a stationary state, an operation state and the like of the HMD 1) on the basis of the detection results of the detection unit 12, switches information selected from two or more types of information, which has been acquired by the acquisition unit 11, in accordance with the determined states of the HMD 1, and generates display data based on the switched information.

When a user wears the HMD 1, the storage section 131 stores a threshold value and a predetermined time for detecting that the user is in the downward state, a threshold value and a predetermined time for detecting that the user is performing the longitudinal swing operation, and a threshold value and a predetermined time for detecting that the user is performing the lateral swing operation. The storage section 131 stores information indicating the type of an image to be displayed in a normal state, information indicating the type of an image to be displayed in the downward state, information indicating the type of an image to be displayed in the longitudinal swing operation, and information indicating the type of an image to be displayed in the lateral swing operation. The normal state is a state in which the user wears the HMD 1 on his/her head, and for example, is facing in a forward direction.

The control section 132 acquires the operation instructions output from the operation unit 10 or the acquisition unit 11. The control section 132 acquires the detection values output from the detection unit 12. The control section 132 learns respective threshold values and predetermined times of the states (including the operations) of the HMD 1 by using the acquired detection values in accordance with the instruction for performing the learning mode included in the acquired operation instructions, and allows the storage section 131 to store the learned threshold values and predetermined times. The states of the HMD 1 include a state (hereinafter, an upward state) in which the user faces an upward direction, a state (hereinafter, a frontward state) in which the user faces a frontward direction, a state (hereinafter, a leftward state) in which the user faces a leftward direction, a state (hereinafter, a rightward state) in which the user faces a rightward direction, a state (hereinafter, an upward left state) in which the user faces an upward left direction, a state (hereinafter, an upward right state) in which the user faces an upward right direction, a state (hereinafter, a downward left state) in which the user faces a downward left direction, and a state (hereinafter, a downward right state) in which the user faces a downward right direction, in a state in which the user wears the HMD 1 on his/her head. Furthermore, the operations of the HMD 1 are a movement in which the user faces downward from the front, a movement in which the user faces the front from upward, a movement in which the user faces downward from upward, and a movement in which the user faces leftward from the front, in a state in which the user wears the HMD 1 on his/her head. A process in the learning mode will be described later.

Furthermore, when acquiring an instruction for setting the execution of image display, the control section 132 generates a display instruction for displaying an image based on display information acquired from a terminal 3 on the display unit 14, and outputs the generated display instruction to the image change section 133. When acquiring an instruction for setting the non-execution of the image display, the control section 132 generates a non-display instruction for not displaying an image based on the display information acquired from the terminal 3 on the display unit 14, and outputs the generated non-display instruction to the image change section 133.

Moreover, on the basis of the acquired detection values and the threshold values/the predetermined times stored in the storage section 131, the control section 132 determines the states (including the operations) of the HMD 1. The control section 132 calculates a change in the states (directions) by using the detection value of the magnetic sensor 121 and the detection value of the angular velocity sensor 123. Furthermore, the control section 132 determines the operations on the basis of a change over time in the orientation calculated using the detection value of the magnetic sensor 121 and the detection value of the angular velocity sensor 123. In addition, the control section 132 may determine the operations by using the detection value of the angular velocity sensor 123. When a period of the downward state continues for a first predetermined time, the control section 132 determines that it is the downward state and outputs the determination result to the image change section 133. When at least one of the operation of facing downward from the front, the operation of facing the front from upward, and the operation of facing downward from upward is detected a first predetermined number of times in a second predetermined time, the control section 132 determines that it is the longitudinal swing operation and outputs the determination result to the image change section 133. When the operation of facing rightward from frontward and the operation of facing leftward from frontward are detected a second predetermined number of times in a third predetermined time, the control section 132 determines that it is the lateral swing operation and outputs the determination result to the image change section 133.

The image change section 133 acquires the information output from the acquisition unit 11. Furthermore, the image change section 133 acquires the determination result output from the control section 132. The image change section 133 selects at least one of the pieces of acquired information in accordance with the acquired determination result, and generates an image to be displayed on the display unit 14 by using the selected information. When the control section 132 outputs the display instruction, the image change section 133 outputs the generated image to the display unit 14. When the control section 132 outputs the non-display instruction, the image change section 133 does not output the generated image to the display unit 14.

The display unit 14 includes a projection part that projects an image, and a transmission type display using a hologram for example. The display unit 14 allows external light to pass therethrough, and displays the image output from the image change section 133 by using the hologram. When the HMD 1 is a spectacles-type display, the display unit 14 may be provided on both right and left sides or on one of the right and left sides.

Figure 2:
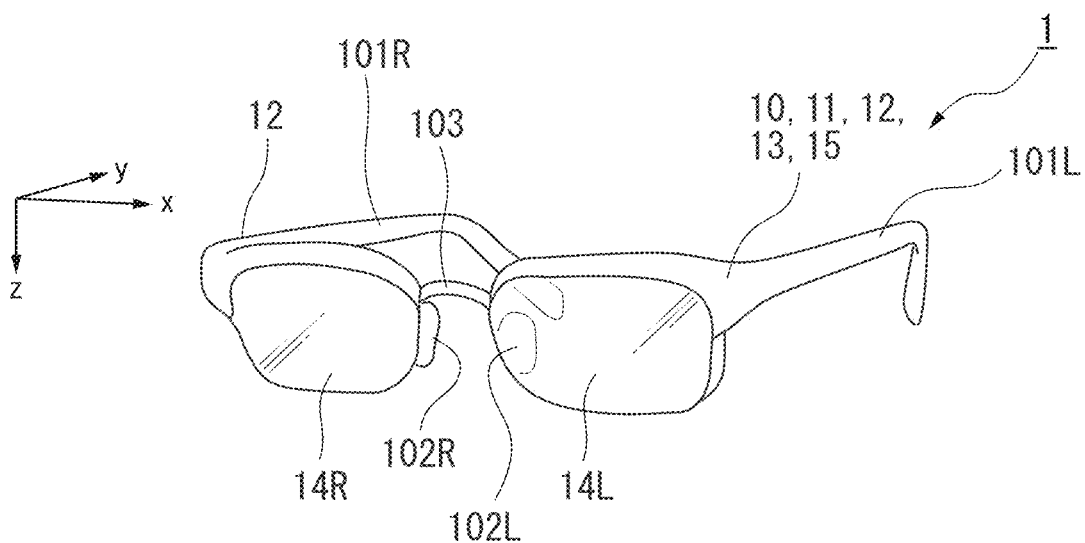
FIG. 2 is a diagram representing an example of an external appearance of the HMD according to the first embodiment.

FIG. 2 is a diagram representing an example of an external appearance of the HMD 1 according to the present embodiment.

Hereinafter, when a user stands upright on the ground and wears the HMD 1 on his/her head, coordinates of the acceleration sensor 122 are assumed that an up and down direction is a z axis direction, a right and left direction is an x axis direction, and a front and rear direction is a y axis direction when viewed from the user. As illustrated in FIG. 2, the acceleration sensor 122, for example, is mounted such that a detection value in the z axis direction is a negative direction.

As illustrated in FIG. 2, the HMD 1 of the present embodiment is a spectacles-type display. The HMD 1 includes display units 14R and 14L on right to left sides thereof, nose pads 102R and 102L, a bridge 103, and temples 101R and 101L. The detection unit 12 is mounted in the right and left temples 101R and 101L, and the operation unit 10, the acquisition unit 11, the storage section 131, the control section 132, and the image change section 133 are mounted in the left temple 101L. The configuration illustrated in FIG. 2 is an example, and the mounting places of the operation unit 10, the acquisition unit 11, the detection unit 12, the storage section 131, the control section 132, and the image change section 133 are not limited thereto.

<Process in Learning Mode>

Next, the process in the learning mode and the state determination of the HMD 1 will be described.

When the instruction for performing the learning mode is acquired, the control section 132 initially prompts a user to adopt each state, and acquires respective detection values of the detection unit 12 for the upward state, the frontward state, the leftward state, the rightward state, the upward left state, the upward right state, the downward left state, and the downward right state. The control section 132 learns the detection values of each state, thereby deciding the threshold values of the detection values of the magnetic sensor 121 and predetermined times, and the threshold values of the detection values of the acceleration sensor 122 and predetermined times in each state. In addition, the control section 132 may decide the threshold values of the angular velocity sensor 123 and predetermined times in each state.

Hereinafter, an example of the process performed by the control section 132 in the learning mode for learning the states will be described.

The control section 132 outputs, to the image change section 133, an instruction for prompting the execution of an operation regarding the state of the HMD 1, for example, an instruction for prompting the upward state. The image change section 133 displays information based on the instruction for prompting the upward state on the display unit 14. The information based on the instruction for prompting the upward state, for example, is "Please, turn your head up". A user continues an orientation, which corresponds to the information displayed on the display unit 14, for a predetermined time (for example, two seconds or more). The control section 132 acquires detection values of each sensor for a period in which the instruction is being displayed on the display unit 14, and times for which each state is maintained. For the purpose of learning, the control section 132, for example, prompts five times of operation with respect to each state, and learns the detection values of each state by using detection values acquired in the five times of operation, thereby deciding threshold values of respective detection values of the magnetic sensor 121 and the acceleration sensor 122 in each state. Furthermore, on the basis of the times during which each state is maintained, the control section 132 decides predetermined times for determining each state.

In addition, the control section 132 may determine each state on the basis of results obtained when the user operates the operation unit 10 at the time of starting and ending of learning of each state, or may set periods, in which the detection values of each sensor are maintained, as periods in which each state is maintained.

When the instruction for performing the learning mode is acquired, the control section 132 subsequently prompts the user to perform each operation, and acquires detection values of the detection unit 12 for the operation of facing downward from the front, the operation of facing the front from upward, the operation of facing downward from upward, and the operation of facing leftward from frontward in the state in which the user wears the HMD 1 on his/her head. The control section 132 learns the detection values of each state, thereby deciding the threshold values of the detection values of the angular velocity sensor 123 and predetermined times in each state. In addition, the control section 132 may decide the threshold values of the detection values of the magnetic sensor 121 and predetermined times, and the threshold values of the detection values of the acceleration sensor 122 and predetermined times in each state.

Hereinafter, an example of the process performed by the control section 132 in the learning mode for learning the operations will be described.

The control section 132, for example, outputs an instruction for prompting the operation of facing downward from frontward to the image change section 133. The image change section 133 displays information based on the instruction for prompting the operation of facing downward from frontward on the display unit 14. The user repeatedly performs the operation, which corresponds to the information displayed on the display unit 14, in a predetermined time (for example, two seconds or more). The control section 132 acquires detection values of each sensor for a period in which the instruction is being displayed on the display unit 14. For the purpose of learning, the control section 132, for example, prompts five sets of operations with respect to each state, and learns the detection values of each state by using detection values acquired in the five sets of operation, thereby deciding threshold values of detection values of the angular velocity sensor 123. In addition, one set of operation is the operation of facing downward from the front, which is performed a plurality of times in a predetermined time. Furthermore, the control section 132, for example, extracts a maximum value from the detection values of each sensor, and decides predetermined times for determining each operation on the basis of periods between the extracted maximum values.

Next, an example of the information stored in the storage section 131 will be described.

FIG. 3 is a diagram representing an example of the detection values regarding the states stored in the storage section 131 according to the present embodiment. As illustrated in FIG. 3, the storage section 131 stores, in states, threshold values of orientations, which are calculated using the detection values of the magnetic sensor 121 and the acceleration sensor 122, and predetermined times in correlation with each other. For example, the storage section 131 stores, in the upward state, threshold values ($\theta_{12}$ and $\phi_{12}$) of an orientation and a predetermined time $t_{11}$ in correlation with each other. The storage section 131 stores, in the frontward state, threshold values ($\theta_{22}$ and $\phi_{22}$) of an orientation and a predetermined time $t_{21}$ in correlation with each other. In addition, $\theta_{12}$ and $\theta_{22}$ indicate an orientation in a horizontal direction and $\phi_{12}$ and $\phi_{22}$ indicate an orientation in a vertical direction. Furthermore, $\theta_{12}$, $\phi_{12}$, $\theta_{22}$, and $\phi_{22}$ may be values having a range. The predetermined times $t_{11}$ to $t_{91}$ may be the same values.

FIG. 4 is a diagram representing an example of the detection values regarding the operations stored in the storage section 131 according to the present embodiment. As illustrated in FIG. 4, the storage section 131 stores, as operations, threshold values of change amounts of orientations and predetermined times in correlation with each other. For example, the storage section 131 stores, as the operation of facing downward from the front, a threshold value ($\Delta\theta_{101}$ and $\Delta\phi_{101}$) of a change amount of an orientation and a predetermined time $t_{101}$ in correlation with each other. The storage section 131 stores, as the operation of facing the front from upward, a threshold value ($\Delta\theta_{201}$ and $\Delta\phi_{201}$) of a change amount of an orientation and a predetermined time $t_{201}$ in correlation with each other.

<Detection of Downward State, Longitudinal Swing Operation, and Lateral Swing Operation>

Next, a detection method of the downward state, the longitudinal swing operation, and the lateral swing operation will be described.

When a state, in which an orientation ($\theta$ and $\phi$) calculated using the detection values of the magnetic sensor 121 and the acceleration sensor 122 is equal to or more than a threshold value ($\theta_{32}$ and $\phi_{32}$) of the orientation, is continued for a first predetermined time $t_{31}$ or more, the control section 132 determines that it is the downward state Furthermore, when at least one of a state, in which the change amount of the orientation is equal to or more than ($\Delta\theta_{101}$ and $\Delta\phi_{101}$) and is equal to or more than a second predetermined time $t_{101}$ (the operation of facing downward from the front), a state, in which the change amount of the orientation is equal to or more than ($\Delta\theta_{201}$ and $\Delta\phi_{201}$) and is equal to or more than a second predetermined time $t_{201}$ (the operation of facing the front from upward), and a state, in which the change amount of the orientation is equal to or more than ($\Delta\theta_{301}$ and $\Delta\phi_{301}$) and is equal to or more than a second predetermined time $t_{301}$ (the operation of facing downward from upward), is detected a first predetermined number of times, the control section 132 determines that it is the longitudinal swing operation. In addition, the control section 132 may decide a threshold value to be used among combinations of the change amounts of the orientation and the predetermined times in the learning mode. In addition, for example, when a state, in which an angular velocity $\omega$ calculated using the detection value of the angular velocity sensor 123 is equal to or more than at least one of threshold values $\omega_{11}$, $\omega_{21}$, and $\omega_{31}$ of angular velocities, is detected a second predetermined number of times or more in the second predetermined times $t_{101}$, $t_{201}$, and $t_{301}$, the control section 132 may determine that it is the longitudinal swing operation.

Furthermore, when at least one of a state, in which the change amount of the orientation is equal to or more than ($\Delta\theta_{401}$ and $\Delta\phi_{401}$) and is equal to or more than a third predetermined time $t_{401}$ (the operation of facing rightward from the front), and a state, in which the change amount of the orientation is equal to or more than ($\Delta\theta_{401}$ and $\Delta\phi_{401}$) and is equal to or more than a third predetermined time $t_{501}$ (the operation of facing leftward from the front), is detected a second predetermined number of times, the control section 132 determines that it is the lateral swing operation. In addition, the control section 132 may decide a threshold value to be used among combinations of the change amounts of the orientation and the predetermined times in the learning mode. In addition, for example, when a state, in which an angular velocity ω calculated using the detection value of the angular velocity sensor 123 is equal to or more than at least one of threshold values $\omega_{41}$ and $\omega_{51}$ of angular velocities, is detected a second predetermined number of times or more in the third predetermined times $t_{401}$ and $t_{501}$, the control section 132 may determine that it is the lateral swing operation.

Example of Information Displayed on Display Unit 14 of HMD 1

Next, an example of the image displayed on the display unit 14 of the HMD 1 will be described.

Figure 5:
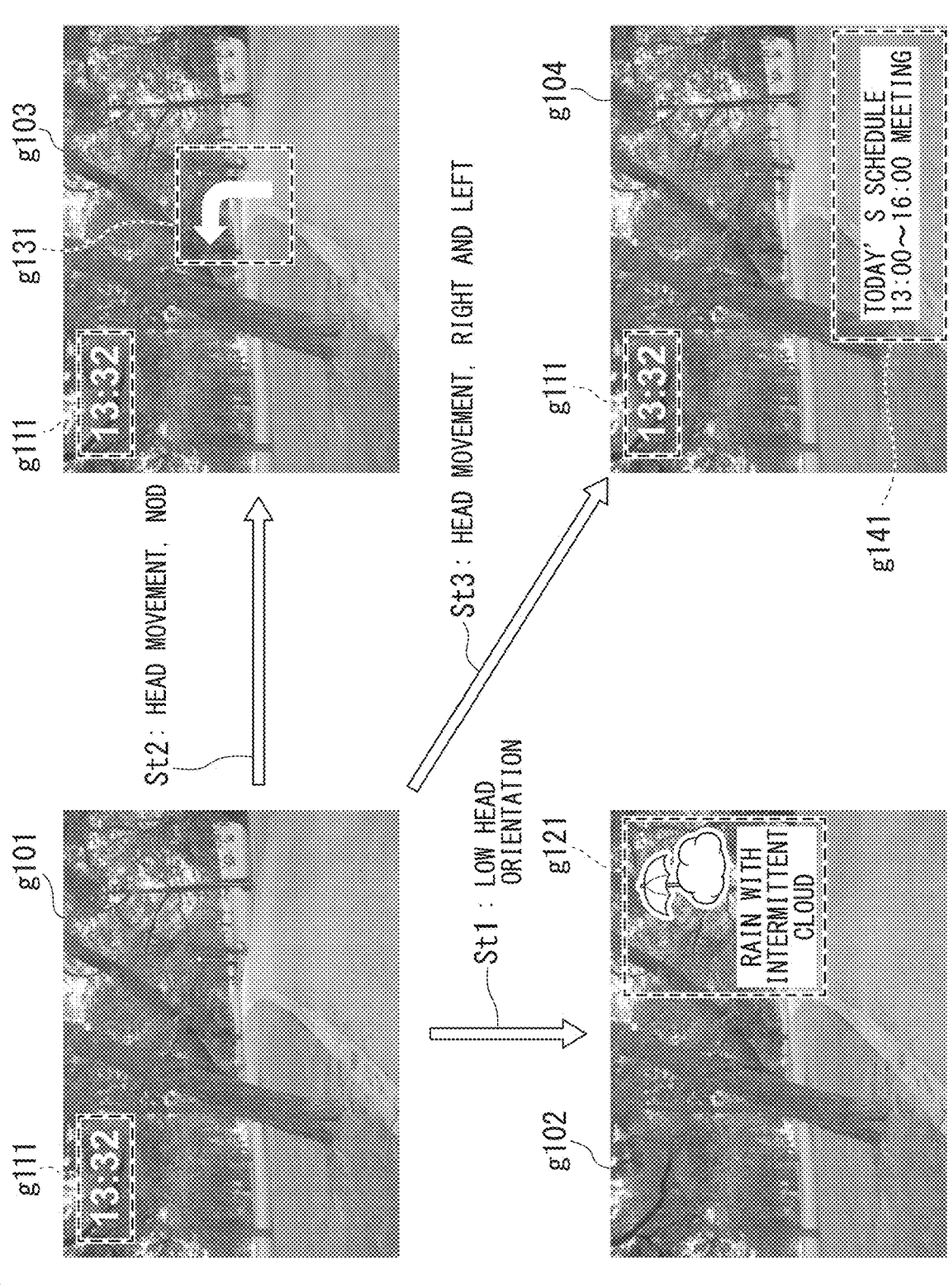
FIG. 5 is a diagram representing an example of information displayed on a display unit according to the first embodiment.

FIG. 5 is a diagram representing an example of the information displayed on the display unit 14 according to the present embodiment.

An image g101 is an example of an image displayed on the display unit 14 in a state in which a user wears the HMD 1 on his/her head and faces frontward (the normal state). The image displayed in the normal state is an image in which time information on an area surrounded by a dashed line g111 overlaps an external image. The external image is not an image generated by the image change section 133, but is an image recognized by the user through the display unit 14. The information on the area surrounded by the dashed line g111 is information set by the user in advance as information to be displayed in the normal state, and for example, is time information.

When the user changes his/her head to the downward state (St1; low head orientation) from the normal state, an image g102 is displayed. The image displayed in the downward state is an image in which information on an area surrounded by a dashed line g121 overlaps the external image. The information on the area surrounded by the dashed line g121 is an image based on information set by the user in advance as information to be displayed in the downward state, and for example, is information on weather forecast of a current place or a destination. That is, in the present embodiment, when the state of the HMD 1 is changed, the control section 132 switches and changes information to be displayed on the display unit 14.

When the user performs the longitudinal swing operation (St2; head movement and nod) from the normal state, an image g103 is displayed. The image displayed in the longitudinal swing operation is an image in which information on an area surrounded by a dashed line g131 overlaps the external image, in addition to the information on the area surrounded by the dashed line g111. The information on the area surrounded by the dashed line is information set by the user in advance as information to be displayed in the longitudinal swing operation, and for example, is information on navigation such as an itinerary from a current place to a destination and a route direction.

When the user performs the lateral swing operation (St3; head movement, right and left) from the normal state, an image g104 is displayed. The image displayed in the lateral swing operation is an image in which information on an area surrounded by a dashed line g141 overlaps the external image, in addition to the information on the area surrounded by the dashed line g111. The information on the area surrounded by the dashed line g141 is information set by the user in advance as information to be displayed in the lateral swing operation, and for example, is information on a schedule.

That is, in the present embodiment, when the operation of the HMD 1 is changed, the control section 132 adds and changes information to be displayed on the display unit 14. When the operation of the HMD 1 is changed from the longitudinal swing operation to the lateral swing operation, the control section 132 adds the information on a schedule, in addition to the information (the time information and the navigation information) displayed on the image g103, thereby changing information to be displayed. In other words, when the HMD 1 of the present embodiment performs a reciprocal operation between the normal state (a reference posture) and states, other than the normal state (the reference posture), in a predetermined time, the HMD 1 displays additional information. The states, other than the normal state (the reference posture), are a downward orientation, an upward orientation, a leftward orientation, a rightward orientation, an upper left orientation, an upper right orientation, a lower left orientation, and a lower right orientation. The additional information, for example, is the navigation information, the schedule information and the like.

In addition, there are cases where the user desires to display information and does not desire to display information during the downward state, the longitudinal swing operation, or the lateral swing operation. Therefore, when the user desires to display information on the HMD 1, the user operates the operation unit 10 and gives an instruction for displaying the information to the HMD 1. However, when the user does not desire to display information on the HMD 1, the user operates the operation unit 10 and gives an instruction for not displaying the information to the HMD 1. The control section 132 generates a display instruction or a non-display instruction in accordance with the instruction information acquired by the operation unit 10. When the control section 132 outputs the display instruction, the image change section 133 displays, on the display unit 14, an image based on information corresponding to the detection value of the detection unit 12 from the information output from the acquisition unit 11. Furthermore, when the control section 132 outputs the non-display instruction, the image change section 133 displays, on the display unit 14, an image based on the information output from the acquisition unit 11.

In the example illustrated in FIG. 5, the time information is displayed on the display unit 14 in the normal state, the time information is changed to another type of information when the state has changed, and another type of information is added when the operation has changed; however, the present invention is not limited thereto. The control section 132 may control the display unit 14 such that blank information is displayed in the normal state, that is, control such that no information is displayed, control the blank information to be changed such that another type of information is displayed when the state has changed, and control another type of information to be added to the blank information when the operation has changed.

<Learning of Threshold Values and Change Procedure of Display Image>

Next, the learning of the threshold values and the change procedure of the display image will be described.

Figure 6:
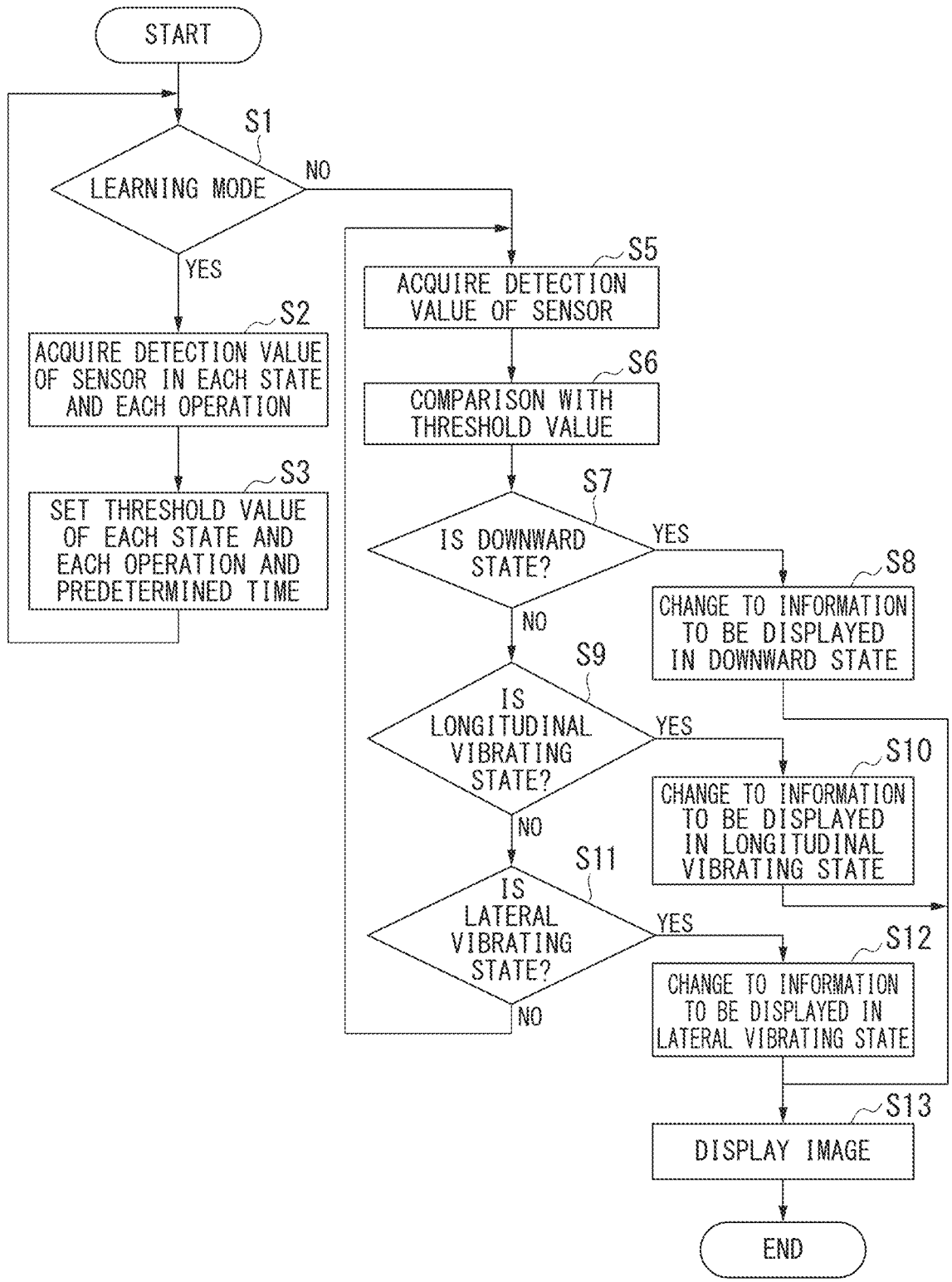
FIG. 6 is a flowchart of learning of threshold values and a change process of a display image according to the first embodiment.

FIG. 6 is a flowchart of the learning of the threshold values and the change process of the display image according to the present embodiment.

In the following process, it is assumed that a user sets in advance information to be displayed in the downward state, information to be displayed in the longitudinal swing operation, and information to be displayed in the lateral swing operation.

(Step S1) The control section 132 acquires operation instructions from the acquisition unit 11. Subsequently, the control section 132 determines whether an instruction indicating the learning mode is included in the acquired operation instructions.

When it is determined that the instruction indicating the learning mode is included (step S1; YES), the control section 132 proceeds to step S2, and when it is determined that the instruction indicating the learning mode is not included (step S1; NO), the control section 132 proceeds to step S5.

(Step S2) The control section 132 acquires a detection value of the magnetic sensor 121 and a detection value of the acceleration sensor 122 in each state and each operation when a user hu wears the HMD 1 on his/her head. Subsequently, the control section 132 calculates an orientation and a change amount of the orientation by using a well-known method with respect to the acquired detection values of the magnetic sensor 121 and the acceleration sensor 122. In addition, the control section 132 acquires a detection value of the angular velocity sensor 123 in each operation when the user hu wears the HMD 1 on his/her head, and calculates an angular velocity by using a well-known method with respect to the acquired detection value.

(Step S3) By using orientations of the calculated each state and each operation and change amounts of the orientations, the control section 132 sets threshold values of orientations for identifying each state and each operation and threshold values of change amounts of the orientations. Subsequently, the control section 132 measures times, at which each state and each operation have been performed, in the learning mode, and sets each predetermined time on the basis of the measured times. Subsequently, the control section 132 writes a threshold value of an orientation for identifying the state of the HMD 1 and a predetermined time in the storage section 131 in correlation with each other as the state of the HMD 1. Subsequently, the control section 132 writes a threshold value of a change amount of an orientation for identifying the operation of the HMD 1 and a predetermined time in the storage section 131 in correlation with each other as the operation of the HMD 1.

In addition, the control section 132 may set threshold values of angular velocities for identifying each operation by using the calculated angular velocities of each operation, measure times, at which each operation has been performed, in the learning mode, and set each predetermined time on the basis of the measured times. Subsequently, the control section 132 may write a threshold value of an angular velocity for identifying the operation of the HMD 1 and a predetermined time in the storage section 131 in correlation with each other as the operation of the HMD 1. The control section 132 ends the process and then returns to the process of step S1.

(Step S5) The acquisition unit 11 acquires information from an external device and outputs the acquired information to the image change section 133. Subsequently, the control section 132 acquires a detection value of the magnetic sensor 121 and a detection value of the acceleration sensor 122 when the user hu wears the HMD 1 on his/her head. Subsequently, the control section 132 calculates an orientation and a change amount of the orientation by using a well-known method with respect to the acquired detection values of the magnetic sensor 121 and the acceleration sensor 122.

(Step S6) The control section 132 compares the orientation and the change amount of the orientation calculated in step S5 with the threshold values stored in the storage section 131.

(Step S7) The control section 132 determines whether it is the downward state in accordance with whether a period, in which the orientation calculated in step S5 is equal to or more than the threshold value of the orientation of the downward state stored in the storage section 131, is continued beyond a first predetermined time $t_{31}$ indicating the threshold value of the predetermined time.

When it is determined that it is the downward state (step S7; YES), the control section 132 proceeds to a process of step S8, and when it is determined that it is not the downward state (step S7; NO), the control section 132 proceeds to a process of step S9.

(Step S8) The control section 132 switches information to be displayed as information to be used for display in the downward state. In addition, an image to be displayed by the display unit 14 is at least one of the information acquired by the acquisition unit 11. The control unit proceeds to a process of step S13.

(Step S9) The control section 132 determines whether it is the longitudinal swing operation in accordance with whether a period, in which the change amount of the orientation calculated in step S5 is equal to or more than the threshold value of the change amount of at least one orientation of downward from the front, frontward from upward, and downward from upward stored in the storage section 131, has been generated a first predetermined number of times or more in the second predetermined times $t_{101}$, $t_{102}$, and $t_{103}$ indicating the threshold values of the predetermined time. When it is determined that it is the longitudinal swing operation (step S9; YES), the control section 132 proceeds to a process of step S10, and when it is determined that it is not the longitudinal swing operation (step S9; NO), the control section 132 proceeds to a process of step S11.

(Step S10) The control section 132 switches information to be displayed as information to be used for display in the longitudinal swing operation. The control unit proceeds to the process of step S13.

(Step S11) The control section 132 determines whether it is the lateral swing operation in accordance with whether a period, in which the change amount of the orientation calculated in step S5 is equal to or more than the threshold value of the change amount of at least one orientation of rightward from frontward and leftward from frontward stored in the storage section 131, is generated a second predetermined number of times or more in the third predetermined times $t_{401}$ and $t_{501}$ indicating the threshold values of the predetermined time. When it is determined that it is the lateral swing operation (step S11; YES), the control section 132 proceeds to a process of step S12, and when it is determined that it is not the lateral swing operation (step S11; NO), the control section 132 returns to the process of step S5.

(Step S12) The control section 132 switches information to be displayed as information to be used for display in the lateral swing operation. The control unit proceeds to the process of step S13.

(Step S13) The image change section 133 generates a display image by using the information switched by the control section 132 in steps S8, S10, or S12. Subsequently, the display unit 14 displays the image generated by the image change section 133.

As above, the learning of the threshold value and the change process of the display image are ended.

In the aforementioned example, the threshold values of all the states illustrated in FIG. 3 are learned in the learning mode; however, only the state of switching the information may be learned.

As described above, according to the present embodiment, it is possible to change information to be displayed in accordance with the movement of the image display device, that is, the movement (the state and the operation) of a user's head. Furthermore, according to the present embodiment, it is possible to change a plurality of pieces of display data by a simple operation of the HMD 1 such as moving upward, nodding, and a lateral swing operation. Furthermore, according to the present embodiment, it is possible to selectively display a large number of pieces of display data by a simple operation of the HMD 1. Furthermore, according to the present embodiment, it is possible to display different types of information in accordance with operation patterns.

Second Embodiment

Figure 7:
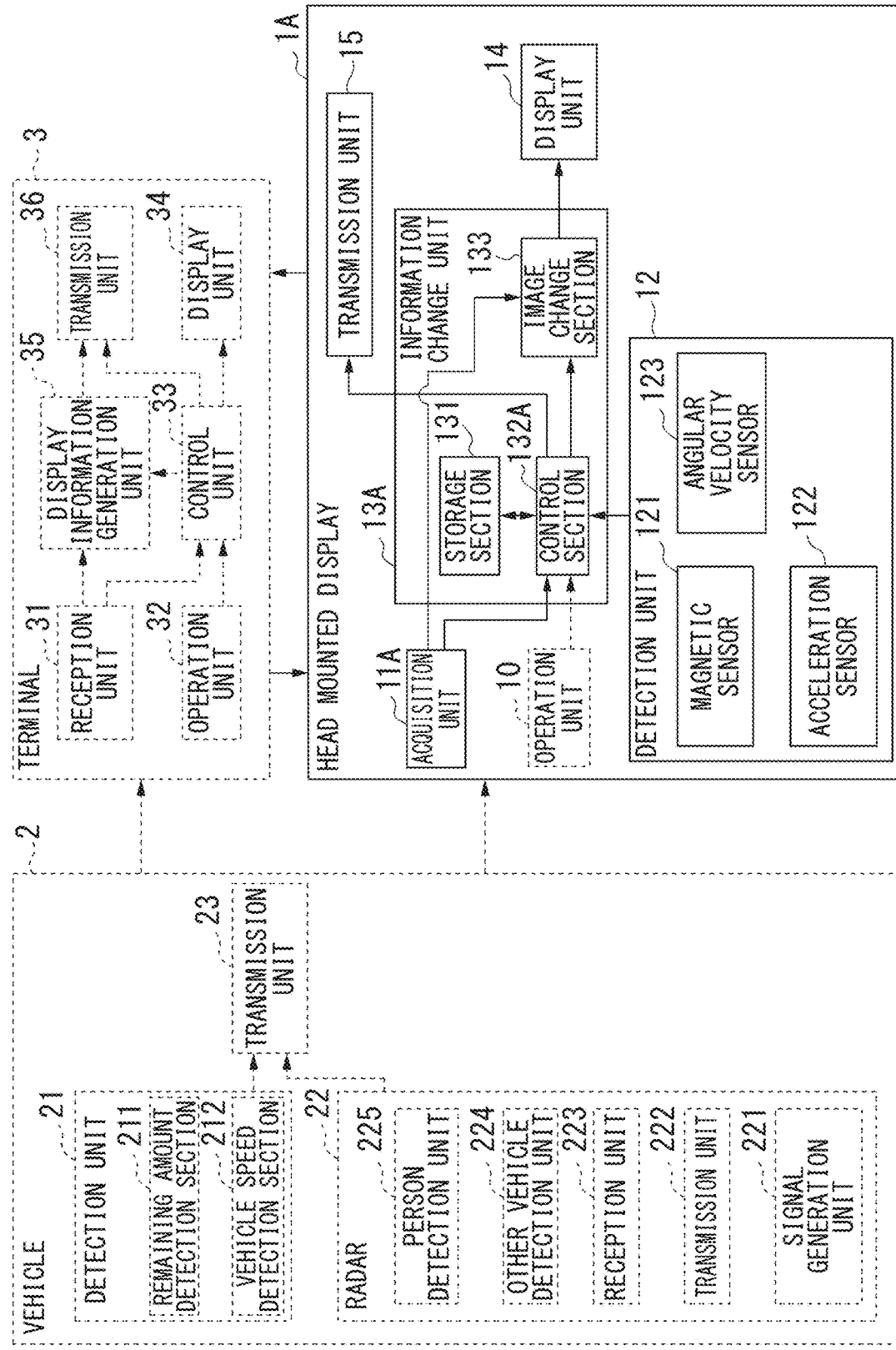
FIG. 7 is a block diagram representing a schematic configuration of an HMD according to a second embodiment.

FIG. 7 is a block diagram representing a schematic configuration of an HMD 1A according to the present embodiment.

As illustrated in FIG. 7, the HMD 1A includes an operation unit 10, an acquisition unit 11A, a detection unit 12, an information change unit 13A, a display unit 14, and a transmission unit 15. The information change unit 13A includes a storage section 131, a control section 132A, and an image change section 133. The same reference numerals are used to designate functional units having the same functions as those of the HMD 1 in the first embodiment, and a description thereof is omitted. Furthermore, as illustrated in FIG. 7, the HMD 1A communicates with a vehicle 2 and a terminal 3. The HMD 1A, for example, communicates with the vehicle 2 and the terminal 3 by using a communication scheme which is a Bluetooth (registered trademark) LE (Low Energy) (hereinafter, referred to as BLE) standard.

The vehicle 2 includes a detection unit 21, a radar 22, and a transmission unit 23. The vehicle 2 includes a vehicle body frame, an engine, a steering wheel (not illustrated) and the like. The detection unit 21 includes a remaining amount detection section 211 and a vehicle speed detection section 212. The radar 22 includes a signal generation unit 221, a transmission unit 222, a reception unit 223, an other vehicle detection unit 224, and a person detection unit 225. The terminal 3 includes a reception unit 31, an operation unit 32, a control unit 33, a display unit 34, a display information generation unit 35, and a transmission unit 36.

Firstly, the vehicle 2 will be described.

The vehicle 2, for example, is a four-wheeled vehicle, a riding type vehicle, a motorcycle and the like. The vehicle 2 transmits information detected by the detection unit 21 to the terminal 3 through the transmission unit 23. Furthermore, the vehicle 2 transmits information detected by the radar 22 to the terminal 3 through the transmission unit 23.

The detection unit 21 detects the state of the vehicle 2 and outputs information indicating the detected state to the transmission unit 23. The remaining amount detection section 211 detects a remaining amount of fuel (gasoline, power and the like) which indicates the state of the vehicle 2, and outputs information indicating the detected remaining amount to the transmission unit 23. The vehicle speed detection section 212 detects a vehicle speed indicating the state of the vehicle 2, and outputs information indicating the detected vehicle speed to the transmission unit 23.

The radar 22, for example, is a multiple-input multiple-output (MIMO) radar using millimeter waves, and detects other vehicles and persons (including pedestrians) and outputs the detection results to the transmission unit 23 as information indicating a radar detection result. In addition, the radar 22 may be configured to detect other vehicles and persons by using infrared rays, ultrasonic waves, an image taken by an imaging device, and the like.

The signal generation unit 221 generates a transmission signal, and outputs the generated transmission signal to the transmission unit 222, the other vehicle detection unit 224, and the person detection unit 225.

The transmission unit 222 includes a transmitting antenna, converts the transmission signal output by the signal generation unit 221 into a transmission wave, and transmits the converted transmission wave through the transmitting antenna.

The reception unit 223 includes a receiving antenna, receives a reception wave which is a reflected wave reflected from an object (another vehicle, a pedestrian and the like), and converts the received reception wave into a reception signal. Furthermore, the reception unit 223 outputs the reception signal to the other vehicle detection unit 224 and the person detection unit 225.

The other vehicle detection unit 224 performs detection of other vehicles with respect to the transmission signal output by the signal generation unit 221 and the reception signal output by the reception unit 223, by using a well-known method, and outputs, to the transmission unit 23, information indicating a result detected when the other vehicles have been detected.

The person detection unit 225 performs detection of persons with respect to the transmission signal output by the signal generation unit 221 and the reception signal output by the reception unit 223, by using a well-known method, and outputs, to the transmission unit 23, information indicating a result detected when the persons have been detected.

The transmission unit 23 transmits, to the terminal 3, the information output by the detection unit 21 and indicating the state of the vehicle 2 and the information output by the radar 22 and indicating the radar detection result.

Next, the terminal 3 will be described.

The terminal 3, for example, is a smart phone, a tablet terminal and the like. The terminal 3 detects operation instructions of a user, and, when an instruction to the HMD 1A is included in the detected operation instructions, the terminal 3 extracts the instruction and transmits the extracted instruction to the HMD 1A. Furthermore, the terminal 3 switches information to be received from information received from a vehicle in accordance with an information selection instruction which is an instruction output from the HMD 1A to select information to be displayed on the display unit 14, generates display information on the basis of the switched information, and transmits the generated display information to the HMD 1A.

The reception unit 31 receives the information transmitted by the vehicle 2 and indicating the state of the vehicle 2 and the information indicating the radar detection result, and outputs the received information indicating the state of the vehicle 2 and information indicating the radar detection result to the display information generation unit 35. Furthermore, the reception unit 31 outputs the information selection instruction output by the HMD 1A to the control unit 33. Furthermore, the reception unit 31 acquires navigation information to a destination, which has been received via a network (not illustrated), and outputs the acquired navigation information to the control unit 33. In addition, the reception unit 31 acquires weather forecast, information indicating a current place, information on a store and the like around the current place, traffic jam information for a course of a vehicle, and the like via a network, and outputs the acquired information to the control unit 33.

The operation unit 32, for example, is a touch panel type sensor mounted on the display unit 34, detects a user's operation, and outputs the detected operation result to the control unit 33. The operation result includes a start instruction for the learning mode, an information display instruction for setting that display of information is to be performed, an information non-display instruction for setting that display of information is not to be performed, information indicating a departure, information indicating a destination, an instruction for acquiring navigation information, and the like.

The control unit 33 generates a switching instruction for switching information to be displayed on the display unit 14 of the HMD 1A among the information received by the reception unit 31 in accordance with the information selection instruction output by the reception unit 31. The control unit 33 outputs the generated switching instruction to the display information generation unit 35. The control unit 33 extracts the start instruction of the learning mode, the information display instruction, and the information non-display instruction from the operation result output by the operation unit 32. The control unit 33 outputs the extracted start instruction of the learning mode, information display instruction, and information non-display instruction to the transmission unit 36. In addition, when the information non-display instruction is included in the operation result output by the operation unit 32, the control unit 33 may output an instruction indicating non-transmission of the display information to the HMD 1A to the transmission unit 36. The control unit 33 outputs an instruction for acquiring the information indicating a departure, the information indicating a destination, the instruction for acquiring navigation information, which are output by the operation unit 32, an instruction for acquiring traffic jam information, and the like to the transmission unit 36.

The display unit 34, for example, is a liquid crystal display panel and includes a backlight. The display unit 34 displays image information output by the control unit 33. The image information includes an image for performing setting and operation of the HMD 1A, an image for setting communication with the vehicle 2, and the like.

The display information generation unit 35 switches the information output by the reception unit 31 to information to be transmitted to the HMD 1A in accordance with the switching instruction output by the control unit 33. The display information generation unit 35 selects information from the information output by the reception unit 31 on the basis of the switched result, and generates display information to be displayed on the display unit 14 of the HMD 1A on the basis of the selected information. The display information generation unit 35 outputs the generated display information to the transmission unit 36. In addition, the display information is at least one of the information on the vehicle speed of the vehicle 2, the information on the remaining amount of fuel of the vehicle 2, the information indicating the radar detection result, the navigation information, the traffic jam information, and the information on a current place.

The transmission unit 36 transmits the start instruction of the learning mode, the information display instruction, and the information non-display instruction output by the control unit 33 to the HMD 1A. Furthermore, the transmission unit 36 transmits the display information to the HMD 1A.

Next, the HMD 1A will be described.

The acquisition unit 11A acquires the start instruction of the learning mode, the information display instruction, the information non-display instruction, and the display information transmitted by the terminal 3. The acquisition unit 11A outputs the acquired display information to the image change section 133. Furthermore, the acquisition unit 11A outputs the acquired start instruction of the learning mode, information display instruction, and information non-display instruction to the control section 132A.

The control section 132A acquires the start instruction of the learning mode, the information display instruction, and the information non-display instruction output by the acquisition unit 11A. The control section 132A acquires detection values output by the detection unit 12.

In the case of the start instruction of the learning mode, the control section 132A learns a threshold value similarly to the control section 132, and allows the storage section 131 to store the learned threshold value and a predetermined time. The control section 132A determines the states (the normal state, the downward state, the longitudinal swing operation, and the lateral swing operation) of the HMD 1A by using the detection values output by the detection unit 12 and the threshold value and the predetermined time stored in the storage section 131 similarly to the control section 132, and generates an information selection instruction on the basis of the determination result. The control section 132A outputs the generated information selection instruction to the transmission unit 15. Furthermore, the control section 132A generates a display instruction or a non-display instruction in accordance with the acquired information, and outputs the generated display instruction or non-display instruction to the image change section 133.

The transmission unit 15 transmits the information selection instruction output by the control section 132A to the terminal 3.

Example of Information Displayed on Display Unit 14 of HMD 1A

An example of the information displayed on the display unit 14 of the HMD 1A will be described.

FIG. 8 is a diagram representing an example of the information displayed on the display unit 14 according to the present embodiment.

An image g201 is an example of an image displayed on the display unit 14 in the normal state in which a user wears the HMD 1A on his/her head. The image displayed in the normal state is an image in which information on an area surrounded by a dashed line g211 overlaps an external image. The information on the area surrounded by the dashed line g211 is navigation information, and for example, includes an image indicating a course, an image indicating a route, an image indicating a current intersection name, an image indicating a next intersection name, an image indicating a distance to a next intersection, and the like. A display position of the navigation information may be set by operating the terminal 3 or the HMD 1A by a user, or may be a position decided in advance. As the position decided in advance, for example, a position which is assumed that a road surface is recognized in the visual field of a user is preferable.

When the user changes his/her head to the downward state (St1; low head orientation) from the normal state, an image g202 is displayed. The image displayed in the downward state is an image in which information on an area surrounded by a dashed line g221 overlaps the external image. The information on the area surrounded by the dashed line g221, for example, includes information indicating a current time, a distance to a destination, information indicating a scheduled time of arrival at the destination, an estimated remaining time when traveling to the destination, and the like. As described above, in the present embodiment, when the HMD 1A is changed from the normal state to the downward state, the HMD 1A switches display information from the navigation information to information on the distance and the like to the destination and displays the switched information. In addition, a display position of the information is set by operating the terminal 3 or the HMD 1A by the user.

When the user mounts the HMD 1A on his/her head and changes their head to the longitudinal swing operation (St2; head movement and nod) from the normal state, an image g203 is displayed. The image displayed in the longitudinal swing operation is an image in which information on areas surrounded by dashed lines g231 to g233 overlaps the external image, in addition to the dashed line g211 indicating the navigation information. The information on the area surrounded by the dashed line g231 includes information indicating a pedestrian position, the information on the area surrounded by the dashed line g232, for example, includes information indicating a vehicle speed, and the information on the area surrounded by the dashed line g233 includes information indicating a remaining amount of fuel. As described above, in the present embodiment, when the HMD 1A is changed from the normal state to the longitudinal swing operation, the HMD 1A switches display information to information obtained by adding information on the vehicle speed, the remaining amount of fuel and the like to the navigation information and, displays the switched information. In addition, in the example illustrated in FIG. 8, in the change to the longitudinal swing operation from the normal state, the information on the vehicle speed, the remaining amount of fuel and the like is displayed in addition to the navigation information displayed in the normal state; however, the present invention is not limited thereto. In the change to the longitudinal swing operation from the normal state, the navigation information may be switched to the information on the vehicle speed, the remaining amount of fuel and the like. Furthermore, display positions of the information on the areas surrounded by the dashed lines g231 to g233 may be a position set in advance, or may be set by operating the terminal 3 or the HMD 1A by the user.

When the user mounts the HMD 1A on his/her head and changes their head to the lateral swing operation (St3; head movement, right and left) from the longitudinal swing operation, an image g204 is displayed. The image displayed in the lateral swing operation is an image in which information (the vehicle speed and the remaining amount of fuel) displayed in the longitudinal swing operation and information on areas surrounded by dashed lines g241 to g245 overlaps the external image, in addition to the dashed line g211 indicating the navigation information. The information on the area surrounded by the dashed line g241 includes information indicating an estimated movement of a person detected in a progress direction of the vehicle 2. The information on the area surrounded by the dashed line g242 includes information indicating an estimated movement of another vehicle in the progress direction of the vehicle 2. The information on the area surrounded by the dashed line g243 includes information indicating a speed limit of a road on which the vehicle 2 travels. The information on the area surrounded by the dashed line g244 includes an image indicating a destination name, and the dashed line g245 includes an image indicating a traveling distance estimated to be travelable until fuel is replenished. As described above, in the present embodiment, when the HMD 1A is changed from the longitudinal swing operation to the lateral swing operation, the HMD 1A switches the display information to the information to be displayed in the lateral swing operation in addition to the information to be displayed in the normal state and the information to be displayed in the longitudinal swing operation, and displays the switched information. In addition, FIG. 8 shows an example of information displayed in the change to the lateral swing operation from the longitudinal swing operation; however, the present invention is not limited thereto. In the change to the longitudinal swing operation from the normal state, the display information may be switched to information obtained by adding the information to be displayed in the normal state and the information to be displayed in the lateral swing operation. Furthermore, display positions of the information on the areas surrounded by the dashed lines g241 to g245 may be set in advance, or may be set by operating the terminal 3 or the HMD 1A by the user.

That is, when the HMD 1A of the present embodiment performs a reciprocal operation between the normal state (a reference posture) and states, other than the normal state (the reference posture), in a predetermined time, the HMD 1A displays additional information. The states, other than the normal state (the reference posture), are a downward orientation, an upward orientation, a leftward orientation, a rightward orientation, an upper left orientation, an upper right orientation, a lower left orientation, and a lower right orientation. The additional information, for example, includes vehicle speed information, information on a remaining amount of fuel, other vehicle information, interpersonal information, destination information and the like. As described above, when a user who boards the vehicle 2 wears the HMD 1A, the additional information is information on the vehicle 2 or information on the travel of the vehicle 2, and is information corresponding to a situation in which the HMD 1A is being used.

In addition, when a user wears the HMD 1A on his/her head and is boarding the riding type vehicle 2, the control section 132A may acquire detection values of the detection unit 12 when the vehicle 2 is travelling on the basis of the vehicle speed of the vehicle 2 and correct threshold values of each state and each operation by using the acquired detection values. For example, in a normal state when a user boards the vehicle 2, the user may bend further forward rather than facing frontward in the learning mode. In such a state, even though the user turns his/her head to the downward state or performs the longitudinal swing operation, it may not be possible to detect each state and each operation by using a threshold value in the learning mode executed in the normal state. Therefore, the control section 132A may correct the threshold value by using the detection value at the time of the travelling. Furthermore, even in the case of the lateral swing operation, at the time of wearing of a helmet, since it may not be possible to detect each state and each operation by using a threshold value set in the learning mode, the control section 132A may correct the threshold value by using the detection value at the time of the travelling.

In addition, in the second embodiment, as examples of information to be displayed on the display unit 14, the navigation information, the vehicle speed, the remaining amount of fuel, the movement of a person or another vehicle in a progress direction, the destination name, the travelable distance until fuel is replenished, and the like have been described; however, the present invention is not limited thereto. An example of other types of information may be information on a current place (road information and information on surrounding stores), and information on a landmark name on a route, a value of a water temperature gauge of the vehicle 2, a travel distance (trip) of the vehicle, a control mode of an engine, a control mode of a suspension, the presence or absence of an emergency vehicle, the presence or absence of road construction work, the presence or absence of traffic jam in a direction further ahead on a route, and the like. These types of information, for example, may be acquired by the terminal 3 via a communication line and be transmitted to the HMD 1A, and the vehicle 2 may acquire road information and transmit the road information to the HMD 1A.

In addition, the first embodiment and the second embodiment have described an example of detecting the downward state, the longitudinal swing operation, and the lateral swing operation; however, the present invention is not limited thereto. For example, as illustrated in FIG. 3, the control section 132 or the control section 132A may detect the upward state, the leftward state, the rightward state, the upward left state, the upward right state, the downward left state, and the downward right state, and switch information to be displayed in accordance with the detected states. That is, the control section 132 or the control section 132A may perform determination of at least one state of up and down, right and left, and oblique directions with respect to the normal state (the reference state) of the HMD 1 or the HMD 1A by using the detection result of the detection unit 12.

As described above, according to the present embodiment, the display of the additional information corresponding to use situations of the HMD 1A can be switched in accordance with the operations (including the states) of the HMD 1A. Furthermore, according to the present embodiment, information on the vehicle 2 can be displayed on the HMD 1A and the displayed information can be switched in accordance with the operations of the HMD 1A.

In addition, in the present invention, switching of display information and display and the like of an image based on the display information may be performed by recording a program for realizing the functions of the HMDs 1 and 1A in a computer-readable recording medium, and allowing the program recorded in the recording medium to be read and executed by a computer system. In addition, the "computer system" herein is assumed to include hardware such as an OS and a peripheral device. Furthermore, the "computer system" is assumed to include a WWW system having a homepage providing environment (or a display environment). Furthermore, the "computer-readable recording medium" indicates a portable medium such as a flexible disk, a magneto-optical disk, a ROM, and a CD-ROM, and a storage unit such as a hard disk embedded in the computer system. Moreover, the "computer-readable recording medium" is assumed to include a medium for holding the program for a constant time period such as a volatile memory (a RAM) in a computer system serving as a server or a client when the program is transmitted via a network such as the Internet or a communication line such as a telephone line.

Furthermore, the aforementioned "program" may be transmitted from a computer system having stored the program in a storage device and the like to other computer systems via a transmission medium or a transmission wave of the transmission medium. In this case, the "transmission medium" for transmitting the program indicates a medium having an information transmission function such as a network (a communication network) of the Internet and the like and a communication line of a telephone line and the like. Furthermore, the aforementioned program may be a program for realizing some of the aforementioned functions. Moreover, the aforementioned program may also be a program capable of realizing the aforementioned functions by combination with a program previously recorded in the computer system, that is, a difference file (a difference program).

REFERENCE SIGNS LIST 1, 1A Head mounted display (HMD)
2 Vehicle
3 Terminal
10 Operation unit
11, 11A Acquisition unit
12 Detection unit
13, 13A Information change unit
131 Storage section
132, 132A Control section
133 Image change section
14 Display unit
15 Transmission unit
121 Magnetic sensor
122 Acceleration sensor
123 Angular velocity sensor
21 Detection unit
22 Radar
23 Transmission unit
211 Remaining amount detection section
212 Vehicle speed detection section
221 Signal generation unit
222 Transmission unit
223 Reception unit
224 Other vehicle detection unit
225 Person detection unit
31 Reception unit
32 Operation unit
33 Control unit
34 Display unit
35 Display information generation unit
36 Transmission unit

What is claim is:
1. An image display device comprising:
  an acquisition unit configured to acquire two or more types of information;
  a detection unit configured to detect at least one of an acceleration, an orientation, or an angular velocity of the image display device;
  a storage section configured to store information comprising,
    for each state of defined states of the image display device, a first threshold value of an orientation and a first predetermined time for detecting the state of the image display device and, for each operation of defined operations of the image display device, a second threshold value of an orientation and a second predetermined time for detecting the operation of the image display device;

an image change section configured to
  determine a state of the image display device based on a detection result of the detection unit and the information stored by the storage section,
  switch from first information of the two or more types of information acquired by the acquisition unit to second information of the two or more types of information in accordance with the state of the image display device, and
  generate display data based on the second information; and
a display unit configured to display the display data,
wherein the image change section determines whether the image display device performs a reciprocal operation between a reference posture and an out-of-reference posture in the second predetermined time based on the detection result of the detection unit and the information stored by the storage section and generates additional information in response to determining that the image display device performs the reciprocal operation between the reference posture and the out-of-reference posture in the second predetermined time.

2. The image display device according to claim 1, wherein, based on the detection result of the detection unit, the image change section determines the state of the image display device regarding at least one of up and down, right and left, or oblique directions with respect to the reference posture of the image display device.

3. The image display device according to claim 1, wherein the additional information is information corresponding to a situation in which the image display device is used.

4. The image display device according to claim 3, wherein, in response to determining that a user of the image display device is boarding a vehicle, the acquisition unit acquires information on the vehicle from the vehicle, and the additional information is the information on the vehicle.

5. The image display device according to claim 1, wherein,
  in response to a determination that a user of the image display device is boarding a vehicle, the acquisition unit acquires information on the vehicle from the vehicle, and
  the additional information is the information on the vehicle.

6. An image display method of an image including a storage section configured to store information defining, for each state of defined states of the image display device, a first threshold value of an orientation and a first predetermined time for detecting the state and, for each operation of defined operations of the image display device, a second threshold value of an orientation and a second predetermined time for detecting the operation, the method comprising:
  acquiring two or more types of information;
  detecting at least one of an acceleration, an orientation, or an angular velocity of the image display device;
  determining a state of the image display device based on a detection result of the detecting and the information stored by the storage section;
  switching from first information of the two or more types of information to second information of the two or more types of information in accordance with the state of the image display device;
  generating display data based on the switching;
  displaying the display data;
  determining whether the image display device performs a reciprocal operation between a reference posture and an out-of-reference posture in the second predetermined time based on the detection result and the information stored by the storage section; and
  generating additional information in response to determining that the image display device performs the reciprocal operation between the reference posture and the out-of-reference posture in the second predetermined time.

* * * * *